(No Model.)

L. HOLT.
PNEUMATIC TIRE.

No. 509,904. Patented Dec. 5, 1893.

WITNESSES:
W. H. James.
[signature]

INVENTOR:
Leopold Holt
per Robt. C. Phillips.
Attorney.

THE NATIONAL LITHOGRAPHING COMPANY,
WASHINGTON, D. C.

UNITED STATES PATENT OFFICE.

LEOPOLD HOLT, OF FRANKFORT-ON-THE-MAIN, GERMANY.

PNEUMATIC TIRE.

SPECIFICATION forming part of Letters Patent No. 509,904, dated December 5, 1893.

Application filed July 6, 1893. Serial No. 479,764. (No model.) Patented in England December 6, 1892, No. 22,352.

*To all whom it may concern:*

Be it known that I, LEOPOLD HOLT, a subject of the Queen of Great Britain, temporarily residing at Frankfort-on-the-Main, in the Empire of Germany, have invented a new and useful Improvement in Pneumatic Tires, (for which I have obtained a patent in Great Britain, No. 22,352, bearing date December 6, 1892,) of which the following is a specification.

My invention relates to an improvement in pneumatic tires of the solid wall type, and it consists in placing within the tire a series of strips or patches of film rubber attached at one edge or point, the said strips or patches being adapted to form sealing patches on the inner side of the tire, the object being to repair punctures in a more reliable and ready manner than is possible by any of the known methods. I attain this object by the construction shown in the accompanying drawings, in which—

Figure 1:
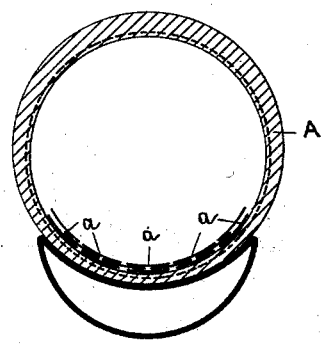
Figure 2:
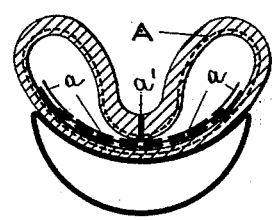
Figure 3:
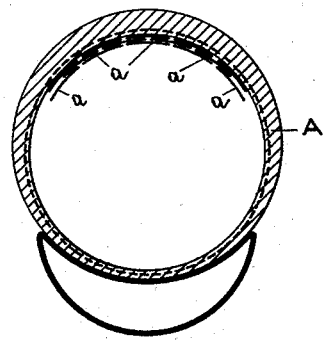
Figure 4:
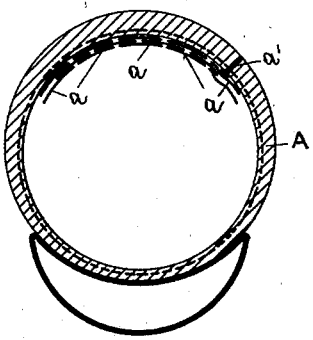
Figure 5:
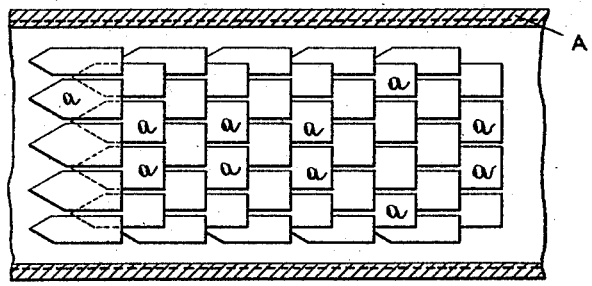

Figure 1 is a view in cross section of a pneumatic tire showing one method of arranging the repairing strips or patches, and Fig. 2 is a similar view showing how repairs are effected. Fig. 3 is a broken view in transverse section showing another method of arranging the repairing strips or patches, and Fig. 4 is a similar view showing how repairs are effected. Fig. 5 is a broken view in sectional plan showing one method of mounting and applying the repairing strips or patches, and Fig. 6 is a broken view in section showing an alternative method of mounting the strips or patches.

Similar letters refer to similar parts throughout the several views.

The solid wall tire A is of the usual construction having the air chamber, canvas retaining cover or pocket, and the outer cover or tread all formed in one solid mass either during or after the process of manufacture. Onto the inner face of the air chamber of the tire either on the bottom thereof as shown by Figs. 1 and 2, or on the top thereof as shown by Figs. 3 and 4, is fixed a series of small strips or patches of film rubber "$a$," "$a$," &c. These strips or patches are each attached by rubber solution to the air chamber of the tire A by one edge or at one point so as to be easily detached therefrom, and they are arranged to overlap one another either in the manner illustrated by Fig. 5, or in any other convenient manner, so that they completely cover in two or more layers the part of the air chamber of the tire to which they are attached and overlap each other. Although I prefer to use film rubber for these strips or patches, any other flexible air proof material may be used.

Figure 6:
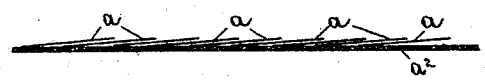

Instead of applying the strips or patches "$a$," "$a$," &c., direct to the inner surface of the tire they may be fixed to a strip "$a^2$" of flexible material as shown by Fig. 6, adapted to be placed in and fixed to the interior of the air chamber of the tire.

To repair a puncture rubber solution is injected through the puncture in the manner now well-known, and if the repairing strips or patches are located at the bottom of the air chamber of the tire as shown by Fig. 1, the outer part of the tire at the point of puncture is pressed down until the bead of solution "$a'$" on the inner surface of the air chamber comes into contact with one or more of the strips or patches "$a$," "$a$," &c., on the bottom of the air chamber as shown by Fig. 2. The tire having been held in this position for a sufficient time to allow the solution to set, it is released and inflated when the bead of solution "$a'$" picks up and tears away the strip or patch to which it has attached itself and thus makes a permanent patch on the inner side of the puncture.

If the repairing strips or patches are located at the top of the air chamber of the tire as shown in Fig. 3 the rubber solution on being injected through the puncture comes at once into contact with one or more strips or patches as shown by Fig. 3. On the inflation of the tire the strip or patch is pressed tightly up against the punctured part of the tire insuring the permanent attachment of the repairing strip or patch thereto.

The strips or patches "$a$," "$a$," &c., may cover any desired part or portion of the air chamber of the tire, and they may be attached thereto during the process of manufacture if desired.

I wish it to be particularly understood that I do not limit myself to the precise details of construction hereinbefore described and illustrated by the accompanying drawings, but that I hold myself at liberty to make such changes and alterations as fairly fall within the spirit and scope of my invention.

I am aware that prior to the date of my invention strips or patches of film rubber or other air tight material have been used within the tubes or chambers of pneumatic tires to automatically close punctures by the pressure of air within the tire, and I do not therefore broadly claim the use of such strips or patches.

What I claim as my invention, and desire to secure by Letters Patent, is—

1. A pneumatic or inflatable tire provided internally—on the bottom or lower side thereof—with a series of strips or patches arranged to overlap one another and fixed at one point only so as to be easily detached from the tire, substantially as and for the purpose described.

2. The combination with a pneumatic tire of the solid wall type, of a series of small strips or patches overlapping each other and each attached either directly or indirectly to the bottom of the air chamber of the tire at one point or part only so as to be easily detached therefrom, as and for the purpose set forth.

3. The improved method of repairing punctures in pneumatic tires of the solid wall type, consisting of placing within the air chamber of the tire on the bottom part thereof a series of strips or patches attached to the air chamber by one point or part only so as to be easily detached therefrom, of injecting through the puncture rubber solution, and of pressing the punctured part of the tire down into contact with the bottom part thereof so that the rubber solution on the inside of the puncture comes into contact with and picks up one or more of the strips or patches, as set forth.

LEOPOLD HOLT.

Witnesses:
  W. H. JAMES,
  G. T. CLARK,
*Both of 70 Chancery Lane.*